United States Patent Office 3,140,038
Patented July 7, 1964

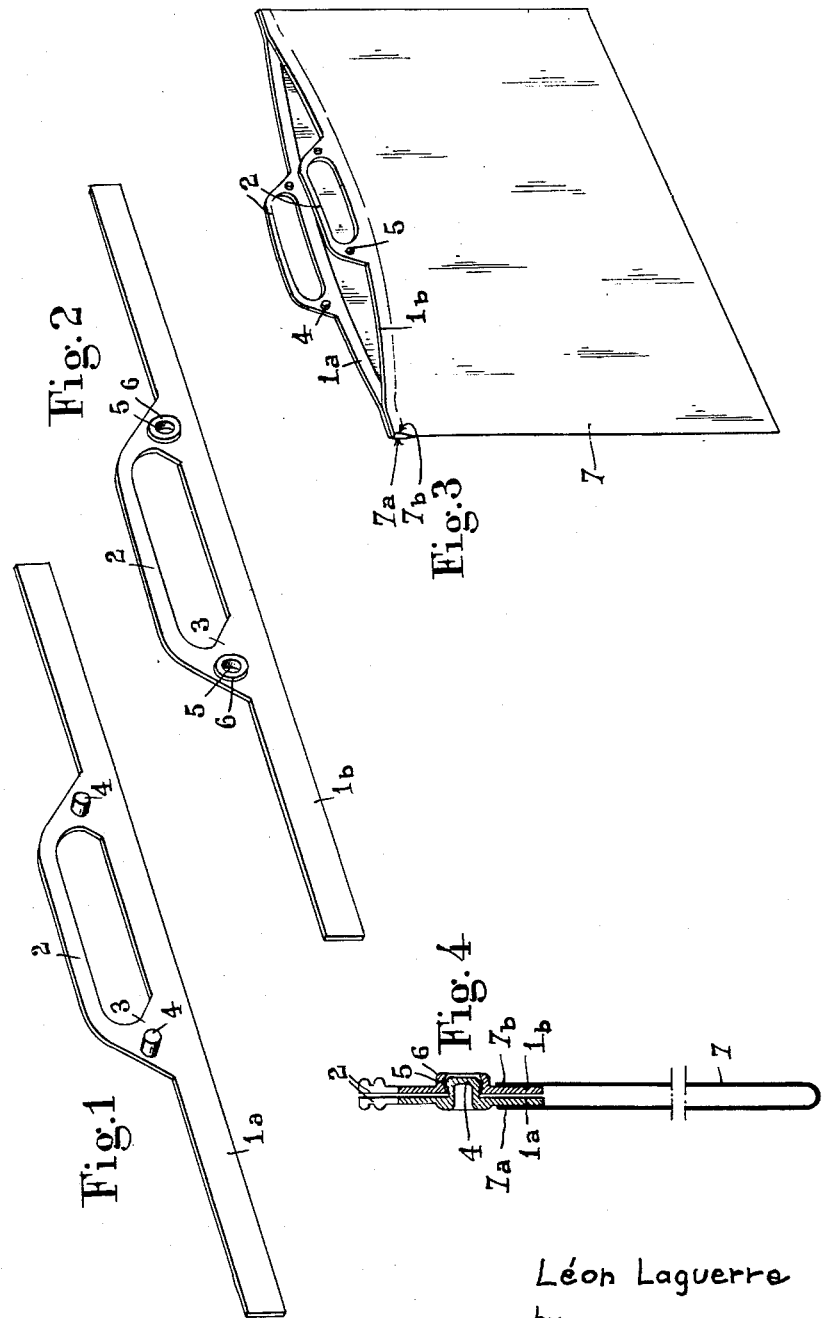

3,140,038
HANDLE AND CLOSURE DEVICE FOR THERMO-
PLASTIC BAGS
Léon Laguerre, 10 Rue Lemoine,
Boulogne-sur-Seine, France
Filed Apr. 19, 1962, Ser. No. 188,618
4 Claims. (Cl. 229—54)

This invention relates to devices for gripping and closing bags designed for holding any products or articles.

It is known that certain paper bags are provided with cardboard gripping handles secured by gluing or stapling. However, handles of this general type are unsuitable for equipping thermoplastic bags and notably polyethylene bags. In fact, they cannot be secured either by gluing or by stapling, for in this last case there would be the risk of tearing the thermoplastic material of the bag.

Therefore, it is the essential object of this invention to provide a handle or like gripping device adapted to be fitted on thermoplastic bags, this device being also designed with a view to close the bag on which it is fitted.

This device comprises essentially a pair of strips or bands also of thermoplastic material, each provided along one of its edges with a central gripping handle or bow, both strips being furthermore provided with snap-action coupling means for example, of the stud and hole type, constituting a kind of domefastener.

The two bands or strips of the device are adapted to be sealed by heat welding along the edges of a thermoplastic bag. Thus, the two registering strips or bands constitute the two complementary bows of a gripping handle. On the other hand, when these bands or strips are fastened to each other through the aforesaid coupling means the device constitutes at the same time a closing system for the bag proper.

This invention is also concerned with thermoplastic bags provided with the gripping and closing device broadly set forth hereinabove.

A typical embodiment of a gripping and closing device according to this invention and of a bag equipped therewith will now be described with reference to the accompanying drawing, wherein:

FIGURES 1 and 2 are perspective views showing separately the two components elements of the device of this invention;

FIGURE 3 illustrates in perspective view but on a smaller scale a thermoplastic bag equipped with the device of FIGS. 1 and 2; and FIGURE 4 is a cross-section illustrating the handle and bag assembly in its closed condition.

The device illustrated in FIGS. 1 and 2 consists essentially of a pair of bands or strips 1a and 1b, made preferably of suitable thermoplastic material, for example polyethylene if this device is designed for equipping polyethylene bags. These two strips have a thickness greater than that of the sheets of polyethylene or other plastic material constituting the bag proper according to the conventional manufacture of these bags. Thus, the thickness of these strips may vary for example from 0.04" to 0.08". They are relatively stiffer than the sheets from which the bags are made. Each strip is formed along one edge with an integral central gripping bow or handle 2, the assembly being formed by moulding. These handles or bows may have any suitable configuration. Preferably, their bases 3, which correspond to the connection between the handles or bows 2 and the strips 1a, 1b, have a greater width in order to increase the strength of the assembly.

These members constitute the two complementary elements of the device of this invention. These two members are provided with releasable coupling means of the snap-action type consisting for example of complementary projections and recesses formed on the two members respectively.

In the example illustrated these coupling means consist of a pair of studs 4 formed integrally on the first strip 1a and a pair of registering holes or recesses 5 formed in the other strip 1b, these holes or recesses 5 being adapted to receive the studs 4 so that the latter engage the former by snap action. To this end, the diameter of the studs 4 increases preferably from the root outwards, as best shown in FIG. 4, and the holes or recesses 5 are shaped accordingly. The strip 1b may be formed with a reinforced circular rib 6 around each hole or recess 5, as shown. The snap-action fitting of the studs 4 into the holes or recesses 5 is permitted by the relative flexibility of the plastic material constituting the two strips 1a and 1b. Preferably, the studs 4 are hollow (see FIG. 4) in order to increase their resiliency. Thus, the studs 4 act somewhat like dome-fasteners permitting a quick assembly of the two strips 1a, 1b with each other.

According to an important feature of this invention these fastening or coupling means are located intermediate the base portions 3 of bows 2 (see FIGS. 1 and 2). This specific position of the coupling means ensures a better fastening of the two strips 1a and 1b in practice, as will be explained presently.

In fact, the two main component elements 1a and 1b of the device are intended to be secured along the two upper edges 7a, 7b of the open side of a thermoplastic bag 7. This assembly may be obtained very easily by heat welding each edge of the bag on the relevant strip 1a or 1b. By construction, the length of these two strips corresponds to the width of the bag. Thus, they act at the same time as means for reinforcing the edges of the thermoplastic bag and, owing to their thickness which is greater than that of the walls of the bag, they also assist in stiffening these walls.

Moreover, the device according to this invention is particularly advantageous in that it ensures a perfect closing of the bag. In fact, it is sufficient to press the two strips 1a and 1b against each other in order to engage the studs 4 into the holes or recesses 5, so that the two strips 1a and 1b, and therefore the edges of the bag to which they are attached, are tightly clamped together.

In this respect it may be noted that even if the bag contains relatively heavy products or articles and is held by means of the handle constituted by the device, its edges will not tend to gape or open. In fact, as already explained hereinabove, the edges of the bag are stiffened by the pair of strips 1a and 1b. On the other hand, the very particular position of the studs 4 and of their corresponding holes or recesses 5 will prevent the weight of the products or articles contained in the bag from tending to move the edges of the bag away from each other, even to a moderate extent.

When the two bows 2 are thus assembled with each other they constitute a single or unitary gripping handle whereby the bag equipped with this device can be transported very conveniently. As already disclosed above, this invention is also concerned with thermoplastic bags provided with this closing and gripping device.

These bags can be opened and closed a great number of times without any inconvenience. On the other hand, they can be used for transporting relatively heavy objects. They can be used for many applications, for example as packing means, for selling miscellaneous articles or products, or as bags for transporting a great number of different articles or products.

As already explained hereinabove, the bows formed on the two complementary members of the device may have a different configuration. Similarly, the coupling means provided thereon for closing the bag may differ from the type illustrated. Thus, the studs and recesses or holes constituting the dome-fasteners illustrated may be replaced by ribs or other projections adapted to fit by snap action into registering grooves or other adequate recesses.

The two component elements of the device may be made from any suitable thermoplastic material, according to the material from which the bags themselves are made, in order to permit the sealing of the former on the latter.

Besides, various modifications and alterations may be brought to the specific form of embodiment shown and described herein, without departing from the spirit and scope of the invention as set forth in the appended claims.

What I claim is:

1. A handle and closure device fitted at the mouth of a bag composed of thin, flexible sheet material, said device comprising two flexible plastic strips attached along the opposite edges of the mouth of the bag, a central gripping bow formed integrally along one edge of each strip, complementary projections and recesses also formed integrally on said strips and which consist on the one strip of studs, on the other strip of corresponding recesses, said projections and recesses registering with each other and being located in the zones where each bow is connected to its strip, said studs and recesses being adapted to engage each other by snap action for releasably coupling said strips and bows.

2. A bag of thin, flexible sheet material having its mouth defined by two parallel edges, a flexible strip of plastic material attached along each of said edges, a central gripping bow formed integrally on one edge of each strip, complementary projections and recesses also formed integrally on each strip and consisting on the one strip of studs and on the other strip of corresponding recesses, said studs and recesses registering by pairs and being located in the zones where each relevant bow is attached to the corresponding strip, said studs and recesses being adapted to engage each other by snap action for releasably coupling said strips and bows.

3. A thermoplastic bag having its mouth defined by two parallel edges, a flexible strip also of thermoplastic material heat-welded along one of said edges, a central gripping bow formed integrally on one edge of said strip, complementary projections and recesses also formed integrally on each strip and consisting on the one strip of studs and on the other strip of corresponding recesses, said studs and recesses registering by pairs and being located in the zones where each relevant bow is attached to the corresponding strip, said studs and recesses being adapted to engage each other by snap action for releasably coupling said strips and bows.

4. A bag of thin, flexible sheet material having its mouth defined by two opposed sheets, a strip of material stiffer than the material of the body of the bag secured along the top edge of each of the sheets, each of the strips being of a length corresponding to the length of the top edge to which it is secured, each of the strips being formed with an integral, upwardly-disposed loop forming a handle, each of the loops having widened areas at their bases or points of joinder to the strips, one of the loops having male snap fastener elements located in said widened areas, the other loop having female snap fastener elements located in its widened areas, the snap fastener elements on the strips being adapted for interengagement to thereby detachably secure the strips together and close the mouth of the bag.

References Cited in the file of this patent

UNITED STATES PATENTS

| | | |
|---|---|---|
| 2,192,131 | Fishwick | Feb. 27, 1940 |
| 2,722,367 | Verlin | Nov. 1, 1955 |
| 2,843,309 | Wheeler | July 15, 1958 |
| 2,873,905 | Denton | Feb. 17, 1959 |
| 2,978,769 | Harrah | Apr. 11, 1961 |
| 3,052,347 | Whiteford | Sept. 4, 1962 |